Dec. 22, 1959     C. D. MacCRACKEN     2,918,219
LIQUID HEATING SYSTEMS
Filed Feb. 9, 1956

INVENTOR.
CALVIN D. MacCRACKEN
BY
James M. Relph.
ATTORNEY

United States Patent Office 2,918,219
Patented Dec. 22, 1959

2,918,219

LIQUID HEATING SYSTEMS

Calvin D. MacCracken, Tenafly, N.J., assignor to Jet-Heet, Inc., Englewood, N.J., a corporation of New York Application February 9, 1956, Serial No. 564,442

6 Claims. (Cl. 237—64)

This invention relates to improvements in liquid heating and circulating systems, and particularly to an improved system for heating and circulating a liquid solely by heat energy.

It is among the objects of the present invention to provide an improved heat-actuated liquid heating and circulating system for domestic heating applications and the like, and while not limited thereto, the present invention finds particular application in and will be described with special reference to domestic heating. Another object of the invention is the provision of an improved arrangement for self-circulation of a hot liquid, and particularly where the hot liquid is utilized for domestic heating. A further object of the invention is the provision of a heat operated pumping system of high efficiency. Another object of the invention is the provision of an improved arrangement for circulating a heated liquid through the convectors in a domestic heating system.

In accordance with a preferred embodiment of the invention, the foregoing and other related objects and advantages are obtained in a system wherein the heat contained in a hot liquid is utilized to supply power for circulating the liquid by vaporizing a lower boiling liquid in a chamber exposed to the hot liquid. In a domestic heating system, the vaporizing chamber of the heat actuated pump may comprise a vessel immersed in the system boiler. The changes in volume accompanying alternate vaporization and condensation of the pump liquid are transmitted through a diaphragm to effect circulation of the system liquid.

Figure 2:
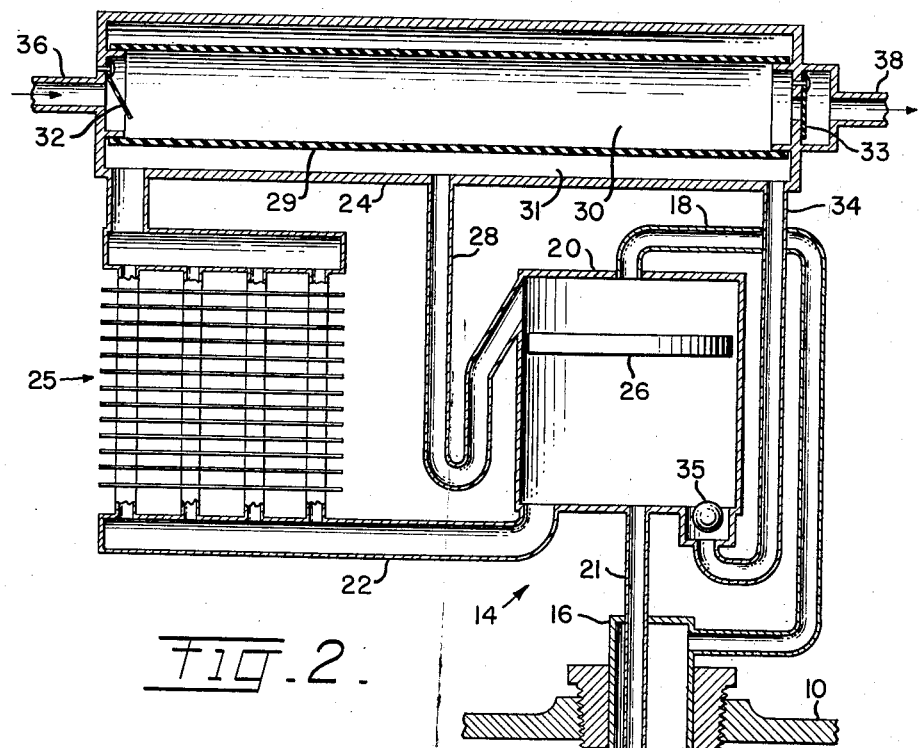
Figure 1:
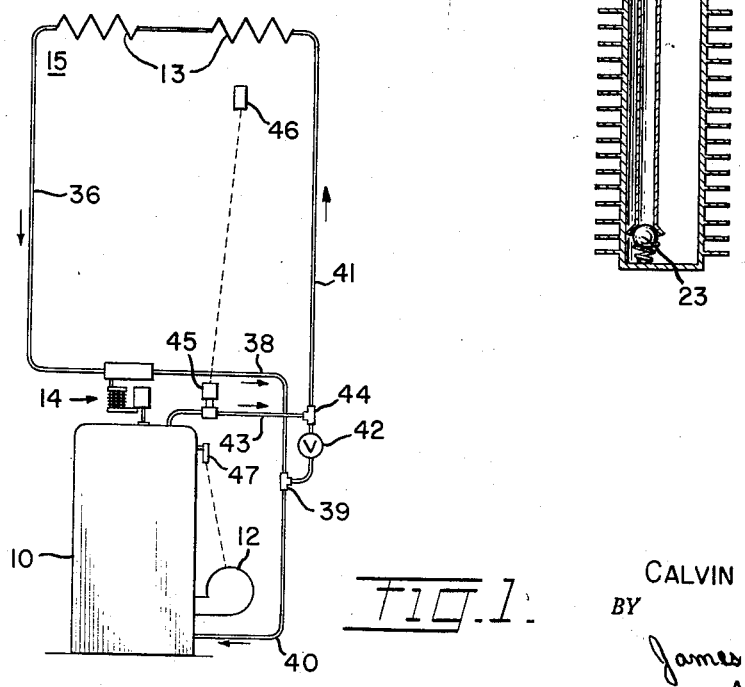

A more complete understanding of the invention, and of further objects and features thereof, can be had by reference to the following description of an illustrative embodiment thereof, when considered in connection with the accompanying drawing, wherein, Figure 1 is a schematic diagram of a domestic heating system embodying the invention, and Figure 2 is a sectional view of the pump unit portion of the system shown in Figure 1.

Referring to Figure 1 of the drawing, there is shown a system embodying the invention for heating and circulating hot water in a domestic heating system which includes a boiler 10 wherein water is heated by a burner 12. It will be understood that the boiler and burner may take many different forms, including solid or fluid fuel burners, an atomic reactor or the like. In the present case, a fluid fuel burner is assumed. The boiler 10, of course, constitutes a heat exchanger having a chamber through which water is circulated to receive heat from the burner 12. The water thus heated is circulated to radiators or convectors 13 by a heat actuated pump 14, referred to hereinafter as a thermopump.

Briefly, a thermopump comprises an arrangement of tubes and vessels in which a liquid is alternately vaporized and condensed to create cyclical variations in fluid volume within the pump. These cyclical volume variations are utilized to force liquid into and out of the pump through a pair of check valves.

In the thermopump 14 (see Figure 2), a vaporizer vessel in the form of an elongated cylinder 16 is connected by an inverted U-shaped tube 18 to cylindrical vessel 20 defining a chamber within which to collect vapor. A liquid inlet tube 21 extends from the bottom of the vapor collector down inside the vaporizer 16, terminating near the lower end of the vaporizer. A check valve 23 preferably is provided at the lower end of the inlet tube 21 to permit liquid flow only from the collector into the vaporizer and not in the opposite direction.

The collector 20 preferably contains a float element 26 of the type described and claimed in the U.S. Patent No. 2,774,470 to R. E. Coleman.

The bottom of the vapor collector 20 is connected by a coupling tube 22 and a heat exchanger 25 to a vapor condenser vessel 24. A parallel connection from the vapor collector 20 to the condenser 24 comprises a relatively small diameter U-shaped tube 28 for transferring vapor. The vapor tube extends downwardly from the upper portion of the vapor collector and then upwardly to the condenser, opening into the condenser at a point somewhat above the top of the vapor collector.

The condenser vessel 24 preferably takes the form of an elongated cylinder which is divided into two compartments by a flexible tubular diaphragm 29. In the particular embodiment of the invention shown in Figure 2, the diaphragm comprises a rubber tube extending the length of the condenser to define a cylindrical compartment 30 inside the tube and an annular compartment 31 outside the tube. It will be seen that the U-tube 28 and the heat exchanger 25 communicate with the annular compartment 31. The central compartment 30 is connected into the main circulation circuit 15 of the heating system through a pair of check valves 32, 33 which constitute inlet and outlet connections to and from the pump.

The pump 14 is completely filled with a liquid having a lower boiling point than the liquid in the boiler 10. Assuming that the boiler liquid is at a temperature above the boiling point of the pump liquid, the liquid in the vaporizer 16 will boil, forming vapor which will flow through the tube 18 and will collect in the upper portion of the vapor collector 20, gradually forcing the liquid level to drop in the collector and in the associated leg of the vapor tube 28. As the vapor collects, liquid will be displaced from the vapor collector through the tube 22 and heat exchanger 25, and through tube 28, into the annular chamber 31. This liquid flow into the annular chamber will force the diaphragm tube 29 to collapse, which, in turn, will displace liquid from the annular compartment through the outlet valve 33.

This action will continue until the liquid levels in the vapor tube 28 and in the collector 20 drop to the lowermost part of the vapor tube 28. Up to this time, the pressure exerted by the vapor on the liquid surface in the vapor tube and (through the float 26) on the surface of the liquid in the vapor collector 20 will balance the head pressure exerted by the column of liquid standing in the condenser 24, the heat exchanger 25 and the tube 22. However, once the vapor in the vapor tube 28 passes the lowermost part of the U, the head pressure exerted by the foregoing column of liquid will no longer be supported by the vapor pressure, since the vapor will be free to pass upwardly through the vapor tube. Once this action starts, liquid will flow into the vapor collector 20 through the tube 22 from the condenser 24, forcing vapor ahead of it out of the collector 20 and through the vapor tube 28 into the condenser. As this vapor enters the condenser, it will encounter cooler liquid and will condense rapidly. This will immediately lower the pressure in the pump, causing liquid to flow into the central compartment 30 through the inlet check valve 32 to replace the volume occupied by the vapor before condensation. As soon as the pump has completely refilled, vapor again will start to collect in the upper part of the collector 20 and the cycle will repeat.

The check valve 23 at the inlet end of the vaporizer tube 21 insures that no vapor bubbles will pass up through the fill tube 21 into the bottom of the vapor collector. Some of these bubbles would condense before reaching the top of the vapor collector, impairing the pumping efficiency, also also would tend to carry liquid out of the vaporizer by percolator action.

The float 26 provides a stable surface over which to collector vapor in the collector 20. Without the float, turbulence in the collector may cause some condensation which will slow down pumping action, and also unnecessarily heat the liquid in the collector.

It can be seen that there will be a continual transfer of heat into the annular condenser compartment 31 by the incoming vapor. While the flow of liquid through the inner compartment 30 will carry away some of this heat, it may happen that the diaphragm material will not allow sufficient heat transfer to keep the condenser from becoming too warm to condense incoming vapor efficiently. In such case, it is advantageous to have the heat exchanger 25, in the form of a plurality of finned tubes in parallel, connected between the collector 20 and the condenser 24, as shown. This will allow the pump liquid to lose heat to the ambient as it flows back and forth between the collector and the condenser. Also, a separate return line 34 may be provided between the annular condenser chamber 31 and the vapor collector 20, with a check valve 35 in the line 34 to insure one way circulation. With this arrangement, outgoing liquid will flow from the vapor collector 20 through the finned tubing coolers 25, while hot liquid will return to the collector primarily through the return line 34 and the check valve 35. By making the flow resistance much lower in the return line 34 than in the finned tube heat exchanger 25, substantially entirely one way flow can be obtained. This also permits the pump to refill more easily, and promotes more uniform cooling by moving liquid progressively through the pump parts.

Referring again to Figure 1, it is seen that the pump 14 is connected in series with the return line 36 from the radiators 13. From the pump outlet, a coupling line 38 leads to a T 39. From the T, one line 40 goes to the inlet of the boiler. Another line 41 leads from the T to the radiators 13, and contains a valve 42 from balancing purposes as described presently.

The outlet line 43 from the boiler is connected to the radiator inlet line 41 at a T 44, and contains a solenoid valve 45 which is connected to be controlled by a thermostat 46 located in the area served by the radiators 13.

The system shown in Figure 1 constitutes a constant flow system, wherein the liquid in the boiler 10 is maintained at or near maximum temperature at all times by the burner 12 under the control of an aquastat 47 which extends into and senses the boiler liquid temperature. Thus, the boiler liquid is always maintained at a high enough temperature to vaporize the pump liquid as previously described, so that continuous circulation is maintained through the pump. However, as long as the solenoid valve 45 is closed, there will be no circulation through the boiler and all of the flow will be through the line 38, T 39, line 41 (including valve 42), radiators 13, and line 36 back to the pump.

When the thermostat 46 calls for heat, the solenoid valve 45 will open, permitting parallel flow through the boiler 10 and through the balancing valve 42 into the main line 41. The relative flow through the boiler and around the boiler can be regulated by the valve 42 to obtain the desired heating effect.

It should be noted that there are a great many possible combinations of liquids that can be used, in the main circulation circuit and in the pump sections of the system depending on the application and on the pressure relationships between the main liquid circuit and the pump section of the system.

In a domestic heating system, for example, operating at or near atmospheric pressure and with water as the heat transfer liquid, the boiler water temperature may be, say, 180° F. In this case, the pump may be filled with methyl alcohol which boils at 140°–150° F. Other combinations of liquids suitable for systems of different types will suggest themselves readily. For example, the same liquid (such as water) might be used in both parts of the system if the circulating liquid is introduced under pressure to raise its boiling point. The pressure difference between the two liquids can then be balanced by suitable stressing of the diaphragm.

What is claimed is:

1. In combination with a heating system of the type comprising a boiler having a chamber within which to heat liquid, heating means associated with said boiler for heating said liquid, radiator means through which to circulate heated liquid, and a closed liquid circuit connecting said radiator means to said boiler chamber, the improvement which comprises a circulator comprising a first vessel extending into said chamber and within which to vaporize a liquid contained in said first vessel, a second vessel disposed above said first vessel within which to collect vapor formed in said first vessel, a liquid conduit extending downwardly from said second vessel into said first vessel, a vapor conduit extending from the upper portion of said first vessel to the upper portion of said second vessel, a third substantially cylindrical vessel having a portion disposed above said second vessel and within which to condense said vapor, a flexible member within said third vessel dividing the space inside said third vessel into an annular first and a cylindrical concentric second compartment, a liquid conduit communicating between said second vessel and said first compartment, a U-shaped vapor conduit extending from the upper portion of said second vessel to said first compartment, first and second check valves disposed at opposite ends of said second compartment and connecting said second compartment into said liquid circuit, said first and second vessels and said first compartment and said conduits being filled with a liquid having a boiling point lower than that of the liquid in said liquid circuit.

2. In combination with a water heating system of the type comprising a boiler having a chamber within which to heat water, means for heating water in said chamber and a water circuit communicating with said chamber through which to circulate water heated in said chamber, the improvement which comprises a circulator comprising a sealed assembly filled with a liquid having a boiling point below that of water and including a first vessel extending into said chamber and within which to vaporize said liquid, a second vessel adjacent to said first vessel and within which to collect vapor formed in said first vessel, a liquid conduit connecting the lower portions of said first and second vessels, a vapor conduit connecting the upper portions of said first and second vessels, a third vessel having a portion disposed above said second vessel within which to condense vapor, a U-shaped tube for transferring vapor from said second to said third vessel and communicating between the upper portion of said second vessel and that portion of said third vessel which is above said second vessel, the lowermost point of said tube being substantially below the top of said second vessel, a flexible member within said third vessel dividing the space inside said third vessel into first and second compartments, one of said compartments being in communication with said second vessel through said U-shaped tube, a pair of check valves connecting the other of said compartments into said water circuit to admit water to and from said other compartment, and a coupling line connecting said one compartment to said second vessel for liquid transfer therebetween.

3. In combination with a heating system of the type comprising a boiler having a chamber within which to heat liquid, heating means associated with said boiler for heating said liquid, radiator means through which to circulate heated liquid, and a closed liquid circuit connecting said radiator means to said boiler chamber, the improvement which comprises a circulator comprising a first vessel extending into said chamber and within which to vaporize a liquid contained in said first vessel, a second vessel within which to collect vapor formed in said first vessel, a vapor conduit connecting the upper portions of said vessels and a liquid conduit connecting the lower portions of said vessels, a third vessel within which to condense said vapor, a flexible diaphragm within said third vessel dividing the space inside said third vessel into first and second compartments, a portion of said first compartment being above said second vessel, a liquid conduit communicating between said first compartment and the lower portion of said second vessel, a U-shaped vapor conduit communicating between the upper portion of said second vessel and that portion of said first compartment which is above said second vessel, and first and second check valves connecting said second compartment into said liquid circuit, said first and second vessels and said first compartment and said conduits being filled with a liquid having a boiling point lower than that of the liquid in said liquid circuit.

4. In combination with a heating system of the type comprising a boiler having a chamber within which to heat liquid, a burner associated with said boiler for heating said liquid, radiator means through which to circulate heated liquid, and a closed liquid circuit connecting said radiator means to said boiler chamber, the improvement which comprises a circulator comprising a first vessel extending into said chamber and within which to vaporize a liquid contained in said first vessel, a second vessel adjacent to said first vessel within which to collect vapor formed in said first vessel, a liquid conduit connecting the lower portions of said vessels and a vapor conduit connecting the upper portions of said vessels, a third vessel disposed above said second vessel within which to condense said vapor, a flexible diaphragm within said third vessel dividing the space inside said third vessel into first and second compartments, a liquid conduit communicating between said first compartment and the lower portion of said second vessel, a U-shaped vapor conduit communicating between said first compartment and the upper portion of said second vessel, first and second check valves connecting said second compartment into said liquid circuit in series with said boiler chamber, said first and second vessels and said first compartment and said conduits being filled with a liquid having a boiling point lower than that of the liquid in said liquid circuit, control means connected to said burner for maintaining the liquid in said chamber at a predetermined temperature, a by-pass conduit connected to said circuit in parallel with said boiler chamber, and flow control means connected into said circuit to selectively direct the flow of liquid through said boiler chamber and through said by-pass conduit.

5. In combination with a heating system of the type comprising a boiler having a chamber within which to heat liquid, a burner associated with said boiler for heating said liquid, radiator means through which to circulate heated liquid, and a liquid circuit connecting said radiator means to said boiler chamber, the improvement which comprises a circulator comprising a first vessel extending into said chamber and within which to vaporize a liquid contained in said first vessel, a second vessel disposed adjacent to said first vessel within which to collect vapor formed in said first vessel, a liquid conduit connecting the lower portions of said vessels and a vapor conduit connecting the upper portions of said vessels, a third vessel within which to condense said vapor, a flexible diaphragm within said third vessel dividing the space inside said third vessel into first and second compartments, a portion of said first compartment being above said second vessel, liquid conducting means connecting said second vessel to said first compartment and including a plurality of finned tubes connected in parallel with each other, a vapor conduit connecting said second vessel to that portion of said first compartment which is above said second vessel, first and second check valves connecting said second compartment into said liquid circuit, said first and second vessels and said first compartment and said tubes and conduits being filled with a liquid having a boiling point lower than that of the liquid in said liquid circuit.

6. In combination with a heating system of the type comprising a liquid conducting circuit, a boiler connected to said circuit within which to heat liquid, and heating means associated with said boiler for heating said liquid, the improvement which comprises a circulator for circulating liquid through said circuit in response to the heating of liquid in said boiler, said circulator comprising a diaphragm and a sealed actuating system for said diaphragm comprising a first vessel in heat exchange relation with said boiler and within which to vaporize a liquid contained in said first vessel, a second vessel adjacent to said first vessel within which to collect vapor formed in said first vessel, a vapor conduit connecting the upper portions of said vessels and a liquid conduit connecting the lower portions of said vessels, a third vessel within which to condense said vapor, said diaphragm forming one wall of said third vessel, a portion of said third vessel being above said second vessel, a liquid conduit communicating between said third vessel and the lower portion of said second vessel, a U-shaped vapor conduit communicating between the upper portion of said second vessel and that portion of said third vessel which is above said second vessel, said vessels and said conduits being filled with a liquid having a boiling point lower than that of the liquid in said liquid circuit.

References Cited in the file of this patent

UNITED STATES PATENTS

| | | |
|---|---|---|
| 809,164 | Beanes et al. | Jan. 2, 1906 |
| 862,867 | Eggleston | Aug. 6, 1907 |
| 1,189,806 | Gibson | July 4, 1916 |
| 2,212,281 | Ullstrand | Aug. 20, 1940 |
| 2,688,923 | Bonaventura et al. | Sept. 14, 1954 |
| 2,744,470 | Coleman | May 8, 1956 |

FOREIGN PATENTS

| | | |
|---|---|---|
| 343,964 | Germany | Nov. 11, 1921 |
| 287,267 | Great Britain | Mar. 22, 1928 |

UNITED STATES PATENT OFFICE

CERTIFICATE OF CORRECTION

Patent No. 2,918,219 December 22, 1959

Calvin D. MacCracken

It is hereby certified that error appears in the printed specification of the above numbered patent requiring correction and that the said Letters Patent should read as corrected below.

Column 2, line 13, for the patent number "2,774,470" read -- 2,744,470 --; column 3, line 9, for "also also" read -- and also --.

Signed and sealed this 14th day of June 1960.

(SEAL)
Attest:
KARL H. AXLINE
Attesting Officer

ROBERT C. WATSON
Commissioner of Patents